Oct. 11, 1932.  J. DUPONT  1,882,487
AXIAL VENTILIATING DEVICE FOR THE STATORS OF ELECTRIC MACHINES
Filed Oct. 15, 1930
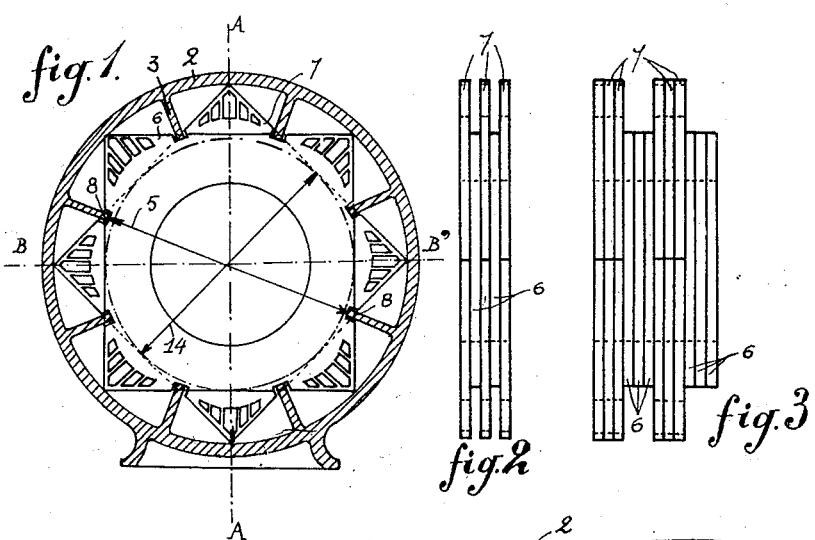
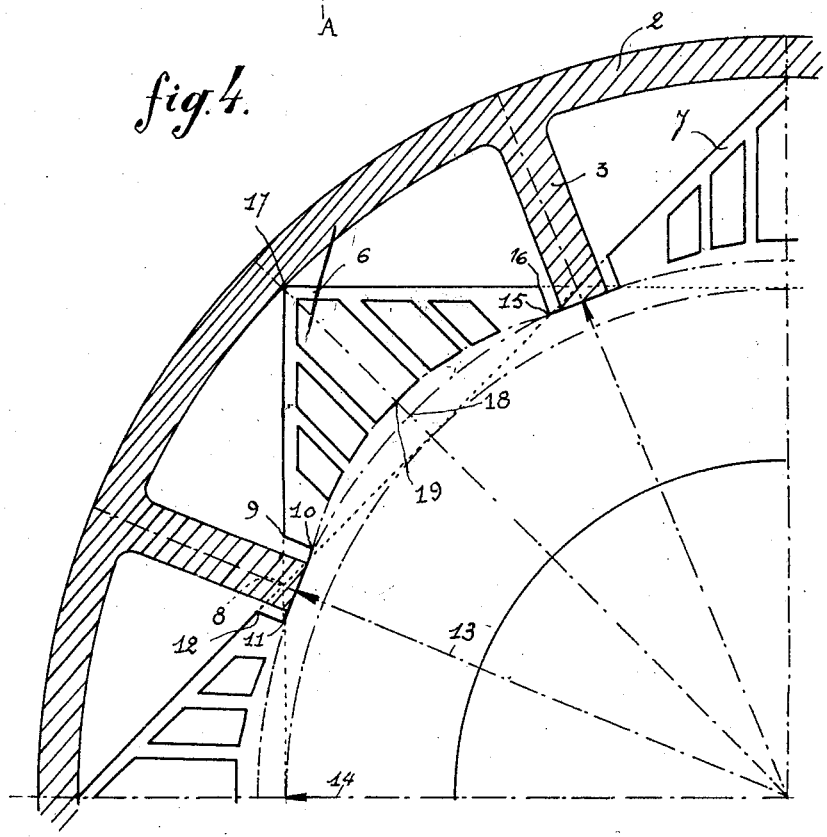
Inventor
JOSEPH DUPONT
Emil Bönnelycke
Attorney Patented Oct. 11, 1932

1,882,487

UNITED STATES PATENT OFFICE

JOSEPH DUPONT, OF LIEGE, BELGIUM

AXIAL VENTILATING DEVICE FOR THE STATORS OF ELECTRIC MACHINES

Application filed October 15, 1930, Serial No. 488,925, and in Belgium October 19, 1929.

In devices for cooling electric machines, the air is sucked or delivered to the external periphery of the magnetic core of the stator, which is generally cylindrical, and through a series of holes in the magnetic core.

The presence of these holes makes it necessary to increase the dimension of the magnetic core so as not to reduce the useful section thereof. Consequently, an increase is produced in the useful material, in the weight, and in the size of the machine.

It has been proposed in such devices to form the magnetic core of a stack of plates in the form of crowns with exterior tops acting like cooling vanes. These devices have the disadvantage of creating eddies in the current of cooling air, which favor the deposit of ducts. Furthermore, this system entails the difficult operation of cutting the plates to the required shape.

My invention removes these disadvantages by constructing the magnetic core of the stator of superposed plates having regular polygonal forms, the parts of plates which are not utilized for the passage of the magnetic flux being perforated in order to constitute straight conduits for ventilation. These plates preferably have the form of a square, hexagon, or other geometric figure.

For the purpose of increasing the cooling action of the current of air, the tops of the plates are, in the invention, angularly displaced relative to one another, this displacement being either single or in series.

In order to increase the diameter of the useful circle of the core for the passage of the magnetic flux, by making use of plates of reduced dimensions, the portions of the plates situated at the corners and in which are made the ventilating openings are limited on one hand by the exterior edges of the said corners and on the other hand by a curved line which passes through the intersection points of the edges of the different displaced plates and exteriorly with respect to the circle passing through said intersection points; in the case of two angular positions of the plates, the height of said curve at its center is equal to twice the difference between the radius of the enclosed circle and the radius of the circle passing through the said intersecting points.

The accompanying drawing illustrates two embodiments of the invention by way of example and in a non-limiting manner.

Figure 1 shows a cross section through a stator.

Fig. 2 shows a method of stacking the plates.

Fig. 3 shows another method of stacking the plates.

Fig. 4 shows on a larger scale the upper left-hand part of Fig. 1 bounded by the axes A—A' and B—B'.

In the drawing, the points 8 represent the points of intersection of the periphery of the polygonal surfaces forming the plates 6 and 7. By placing the centering ribs 3 of the said plates, hatched in Fig. 4, in the body of the cast iron frame 2 of the machine, along the axis of the radius passing through the above-mentioned points of intersection 8, it may be arranged for this centering diameter to be greater than the diameter of the circle inscribed in the polygonal figure.

In order to receive the centering ribs, the plate 6 are cut away along the broken lines 9, 10, 11, and the plates 7 along the broken lines 12, 11, 10. Over the part 11, 10 the diameter of the centering circle of all the plates corresponds to the radius 13, greater than the radius 14 inscribed in the polygonal figure, and which without angular displacement would be that of the useful circle for the magnetic flux.

In the particular case shown in Fig. 1, if the length of the diameter 14 is designated by $d$, this length is 1.082 $d$. This corresponds to an increase of about 8%.

In order to consider the diameter of this useful circle as being duly increased, it is necessary for the part 10, 15 to have for the passage of the flux a section equal to that presented in the part 11, 10. As a section of passage corresponding to the segment limited by the straight line 10, 15, and the circular centering arc 10, 18, 15 is lost in the plate 7. it is sufficient to leave in the adjacent plate 6 and beyond the circular arc 10, 18, 15 in the corner 10, 18, 15, 16, 17, 9 a passage for the flux corresponding to this segment. This passage corresponds to the surface 10, 19, 15, 18, 10. In this way the diameter of the useful circle is increased in a ratio approaching the above-mentioned theoretic increase of 8%.

It would moreover be possible to take the greater part of the increase in diameter of the useful circle for the magnetic flux by influencing the various characteristics of the machine. In this way it would be possible, for example, by preserving the initial reduction in the core, to increase proportionally the bore of the stator and permit an increase of 5% in the bore, and thereby produce an increase in power of 10% for equal induction in the iron and density in the copper. This is obtained without increasing either the external dimensions or the weight of the iron plates brought into action in the construction of the machine.

The free spaces left in the corners of the plates where the magnetic flux does not pass are employed for securing the ventilation and cooling of the stator. The holes are formed in this corner of the plate 6, for example, by carrying them outside the curve 10, 19, 15. These holes, on account of the superposition of the plates, form ducts and produce a cooling surface without increasing as a consequence the weight of the iron brought into action or producing a reduction in the useful section of the core.

By suitably proportioning the number and the shape of the holes formed in the corners a cooling surface of larger extent is obtained, which permits the rapid dissipation of the heat by the losses in the copper and in the useful iron.

As a consequence of the displacement of the plates, the cooling surface is considerably increased on account of the by-passed movements of the air flow, which can pass between the plates.

In addition, the plates, which, in cores composed of superposed plates which have not been displaced angularly, might on account of irregularities in cutting out, not be flush along their contour with the cooling surface, are, in the case of angularly displaced superposed plates, always in projection and so do not escape contact with the ventilation air flow. These plates are displaced with respect to each other from one to the next (Fig. 2) or in sets of a number of plates (Fig. 3).

The advantages which result from the described arrangement are:

1. The corners of the plates are utilized as cooling surfaces. The cooling air axially passes with the minimum of loss. The cutting of the plates is rendered easy, and all the plates may be the same. They are simply assembled by superposition with the ventilating perforations in registry.

2. The air passes through the machine in a straight line, with a minimum of resistance. The ventilator consequently may have a reduced capacity. There are no curves in the ventilating conduits, facilitating cleaning by forcing compressed air therethrough.

3. Since only the corners are utilized as cooling surfaces, and since each plate is displaced relatively to the others, a maximum cooling surface is effected to conduct and dissipate the heat.

What I claim is:

1. In a stator for electric machines, a magnetic core comprising a plurality of superposed polygonal plates angularly offset relatively to each other, and having ventilating passages in each projecting corner, which passages are located in the spaces limited by the external contour of said projecting corners and by a curve passing through the intersection points of the edges of the succeeding plates and exteriorly with respect to the circle passing through said intersection points.

2. In a stator for electric machines, a magnetic core, comprising a plurality of superposed square plates, the alternate plates being angularly displaced, and having ventilating passages in each projecting corner, which passages are located in the spaces limited by the external contour of said projecting corners and by a curve passing through the intersection points of the succeeding plates and exteriorly with respect to the circle through said intersection points, the height of the curve at its center being approximately equal to twice the difference between the radius of the circle passing through the intersection points and the radius of the circle inscribed in the square plate.

3. In a stator having a magnetic core as set forth in claim 1, including centering ribs at the intersection points for maintaining the plates in position.

4. In a stator having a magnetic core as set forth in claim 2, including centering ribs at the intersection points for maintaining the plates in position.

In testimony whereof I have affixed my signature.

JOSEPH DUPONT.